United States Patent
Hayashi et al.

(10) Patent No.: US 6,232,377 B1
(45) Date of Patent: May 15, 2001

(54) FLAME RETARDANT COMPOSITION

(75) Inventors: Akio Hayashi, Yokohama; Katsuhiro Horita, Kanagawa; Koji Ishihara, Tokyo, all of (JP)

(73) Assignee: Nippon Unicar Company Ltd., Tokyo (JP)

( * ) Notice: Subject to any disclaimer, the term of this patent is extended or adjusted under 35 U.S.C. 154(b) by 0 days.

(21) Appl. No.: 09/488,449

(22) Filed: Jan. 20, 2000

(30) Foreign Application Priority Data

Feb. 19, 1999 (JP) ................................................ 11-040946

(51) Int. Cl.$^7$ ...................................................... C08K 5/34
(52) U.S. Cl. .......................... 524/100; 524/101; 524/405; 524/436; 524/437
(58) Field of Search .................................. 524/436, 437, 524/405, 100, 101

(56) References Cited

U.S. PATENT DOCUMENTS

| | | | |
|---|---|---|---|
| 4,098,762 | 7/1978 | Miyata et al. | 260/45.7 R |
| 4,255,303 | 3/1981 | Keogh | 260/23 H |
| 4,814,135 | 3/1989 | Heitz | 264/564 |
| 4,857,600 | 8/1989 | Gross et al. | 525/285 |
| 5,076,988 | 12/1991 | Rifi | 264/211 |
| 5,153,382 | 10/1992 | Gross et al. | 174/110 SR |
| 5,272,236 | 12/1993 | Lai et al. | 526/348.5 |
| 5,317,036 | 5/1994 | Brady, III et al. | 523/223 |
| 5,418,272 * | 5/1995 | Kawabata et al. | 524/436 |
| 5,561,185 * | 10/1996 | Hashimoto | 524/436 |
| 5,707,732 * | 1/1998 | Sonoda et al. | 524/436 |
| 5,889,087 * | 3/1999 | Hayashi et al. | 524/436 |
| 6,107,385 * | 8/2000 | Imahashi et al. | 524/436 |

FOREIGN PATENT DOCUMENTS

WO93/08221  4/1993  (WO).

* cited by examiner

Primary Examiner—Veronica P. Hoke
(74) Attorney, Agent, or Firm—Saul R. Bresch

(57) ABSTRACT

A flame retardant composition comprising (A) about 50 to about 95 percent by weight of at least one ethylene co-polymer selected from an ethylene/vinyl ester copolymer; ethylene/alpha, beta unsaturated carboxylate copolymer; and very low density ethylene/alpha-olefin copolymer; and (B) about 5 to about 50 percent by weight of an ethylene/alpha-olefin copolymer having been prepared with a single site catalyst, and, for each 100 parts by weight of component (A) and component (B) combined, (C) about 2 to about 50 parts by weight of a polyethylene modified with a functional group containing compound;

(D) about 5 to about 250 parts by weight of a metal hydrate;

(E) about 1 to about 12 parts by weight of a triazine ring containing compound; and (F) about 0.5 to about 5 parts by weight of a flame retardant compound selected from the group consisting of a boron compound, a molybdenum compound, and a silicone.

10 Claims, No Drawings

FLAME RETARDANT COMPOSITION

TECHNICAL FIELD

This invention relates to a flame retardant composition useful in cable construction.

BACKGROUND INFORMATION

Polyolefin resins are commonly used as a material for the insulation and the sheath layers of wires and cables. Recently a higher degree of flame retardance has been demanded in accordance with, for example, a vertical tray test, which can be referred to as the "70,000 Btu per hour" test. Flame retardants such as organic halogen compounds; flame retardant aids such as antimony trioxide; or flame retardant resins such as poly (vinyl chloride) and chlorinated polyethylene can be blended into polyolefins to render them flame retardant; however, these additives cause dripping, smoking, and/or the emission of harmful gases when subjected to burning, and can also cause metals to corrode.

To solve these problems, addition of inorganic flame retardants such as metal hydroxides to the polyolefin resins was proposed and the composition was applied as insulating and sheath layers to various wires and cables. This did not, however, solve the problem of drip or improve the vertical tray test to a commercially desirable extent.

DISCLOSURE OF THE INVENTION

An object of this invention, therefore, is to provide a flame retardant cable composition, which reduces drip and improves on the vertical tray test. Other objects and advantages will become apparent hereinafter.

According to the present invention, the above object is met by a flame retardant composition comprising
(A) about 50 to about 95 percent by weight of at least one polymer selected from the group consisting of ethylene/vinyl ester copolymer; ethylene/alpha, beta unsaturated carboxylate copolymer; and very low density ethylene/alpha-olefin copolymer; and
(B) about 5 to about 50 percent by weight of an ethylene/alpha-olefin copolymer having a melt flow rate of about of about 0.5 to about 50 grams per 10 minutes; a density of 0.860 to 0.935 gram per cubic centimeter; and a Mw/Mn ratio of up to about 3, said copolymer having been prepared with a single site catalyst, and, for each 100 parts by weight of component (A) and component (B) combined,
(C) about 2 to about 50 parts by weight of a polyethylene modified with a functional group containing compound;
(D) about 5 to about 250 parts by weight of a metal hydrate;
(E) about 1 to about 12 parts by weight of a triazine ring containing compound; and
(F) about 0.5 to about 5 parts by weight of a flame retardant compound selected from the group consisting of a boron compound, a molybdenum compound, and a silicone.

DESCRIPTION OF THE PREFERRED EMBODIMENTS(s)

The first component of the composition is (A) about 50 to about 95 percent by weight, preferably about 55 to about 75 percent by weight, of at least one polymer selected from the group consisting of ethylene/vinyl ester copolymer; ethylene/alpha, beta unsaturated carboxylate copolymer; and very low density ethylene/alpha-olefin copolymer.

The ethylene and vinyl ester copolymer is generally produced by a high-pressure radical polymerization process. Examples of vinyl esters, which can be used in the preparation of the copolymer are vinyl propionate, vinyl acetate, vinyl caprate, vinyl laurate, vinyl stearate, and vinyl trifluoroacetate. Vinyl acetate is preferred.

It is desirable that the ethylene/vinyl ester copolymer has a melt flow rate of about 0.5 to about 50 grams per 10 minutes, preferably about 0.5 to about 10 grams per 10 minutes, and a vinyl monomer content of about 5 to about 40 percent by weight, preferably about 10 to about 35 percent by weight.

The ethylene and alpha, beta unsaturated carboxylate copolymer is also generally produced by a high-pressure radical polymerization process. Examples of the unsaturated carboxylates are methyl acrylate, ethyl acrylate, propyl acrylate, isopropyl acrylate, n-butyl acrylate, cyclohexyl acrylate, lauryl acrylate, stearyl acrylate, glycidyl acrylate, methyl methacrylate, ethyl methacrylate, propyl methacrylate, isopropyl methacrylate, n-butyl methacrylate, cyclohexyl methacrylate, lauryl methacrylate, stearyl methacrylate, glycidyl methacrylate, monomethyl maleate, monoethyl maleate, diethyl maleate, and monoethyl fumarate. The alkyl acrylates are preferred, particulary ethyl acrylate.

It is desirable that the ethylene/unsaturated carboxylate copolymer has a melt flow rate of about 0.5 to about 50 grams per 10 minutes, preferably about 0.5 to about 10 grams per 10 minutes, and a monomer content of about 5 to about 40 percent by weight, preferably about 10 to about 35 percent by weight.

In the very low density ethylene/alpha-olefin copolymer, the alpha-olefin generally contains about 3 to about 12 carbon atoms. Examples of the alpha-olefins are propylene, 1-butene, 1-pentene, 1-hexene, 1-octene, 1-decene, 1-dodecene, and 4-methyl-1-pentene. The copolymer is linear.

It is desirable that the linear very low density ethylene/alpha-olefin copolymer has a melt flow rate of about 0.5 to about 50 grams per 10 minutes, preferably about 0.5 to about 10 grams per 10 minutes, and a density of 0.860 to 0.910 gram per cubic centimeter.

The linear very low density ethylene/alpha-olefin copolymer can be prepared by using a Ziegler type catalyst system, a Phillips type catalyst system, or other conventional transition metal catalyst systems.

A Ziegler type catalyst system can be comprised of a transition metal compound such as titanium or vanadium compounds; a cocatalyst, e.g., an organometallic compound such as an organoaluminum compound; and a catalyst support such as an oxide of silicon, titanium, or magnesium. A Phillips type catalyst system can be comprised of a chromium oxide and a catalyst support such as an oxide of aluminum. Other conventional transition metal catalyst systems can be exemplified by molybdenum oxide and a catalyst support such as an oxide of aluminum.

The very low density ethylene/alpha-olefin copolymers can be produced under high-pressure (at or above 50 Mpa), medium pressure (10 to 50 Mpa) or low pressure (normal pressure, about 10 Mpa). The polymerization process is not particularly limited, and can be carried out by solution, suspension, slurry, or vapor phase processes.

The second component of the composition is (B) about 5 to about 50 percent by weight, preferably about 25 to about 45 percent by weight, of an ethylene/alpha-olefin copolymer having a melt flow rate of about of about 0.5 to about 50 grams per 10 minutes; a density of 0.860 to 0.935 gram per cubic centimeter; and a Mw/Mn ratio of up to about 3, said copolymer having been prepared with a single site catalyst. This copolymer is also linear.

The linear ethylene/alpha-olefin copolymer can be prepared by co-polymerizing ethylene with an alpha-olefin having 3 to 12 carbon atoms by using a single site catalyst having a catalytic active species with a constrained geometric shape. Examples of the alpha-olefins are propylene, 1-butene, 1-pentene, 1-hexene, 1-octene, 1-decene, 1-dodecene, and 4-methyl-1-pentene. Among them, 1-octene is preferable with respect to mechanical properties and processability.

Linear in the linear ethylene/alpha-olefin copolymers means a small amount of long-chain branching can be present.

The linear ethylene-alpha-olefin copolymer desirably has a melt flow rate of about 0.5 to about 50 grams per 10 minutes, preferably about 0.5 to about 10 grams per 10 minutes; a density of 0.860 to 0.935 gram per cubic centimeter, preferably 0.860 to 0.910 gram per cubic centimeter; and a ratio (Mw/Mn) of weight average molecular weight (Mw) to number average molecular weight (Mn) determined by size exclusion chromatography of not more than about 3.0, and preferably not more than about 2.5.

The single site catalyst to be used for the polymerization of the ethylene/alpha-olefin copolymer is called a single site because its active points are a single species (single site). It is also called as metallocene or Kaminsky catalyst. Examples of these catalysts follows.

A transition metal compound expressed by formula (i):

$$(Cp)_m MR_n R'_p \qquad (i)$$

wherein Cp is an unsubstituted or substituted cyclopentadienyl group; M is a transition metal of groups 4 to 10 of the Periodic Table of the Elements; R and R' are each independently a halogen atom, a hydrocarbon group having 1 to 20 carbon atoms, or a hydrocarboxyl group; m is a number from 1 to 3; n is a number from 0 to 3; and p is a number from 0 to 3, and m+n+p is equal to the oxidation state (valence number) of M.

A transition metal compound expressed by formulas (ii) and (ii'):

$$(C_5 R'_m)_p R''_s (C_5 R'_m) MQ_{3-p-x} \qquad (ii)$$

$$R''_s (C_5 R'_m)_2 MQ' \qquad (ii')$$

wherein $C_5 R'_m$ is an unsubstituted or substituted cyclopentadienyl group; each R' is independently a hydrogen atom, an alkyl group having 1 to 20 carbon atoms, an alkenyl group, an aryl group, an alkylaryl group, an arylalkyl group, or 2 carbon atoms, which form a part of $C_4$ to $C_6$ ring by bonding to each other; R'' is one or more of carbon, germanium, silicon, phosphorus, or nitrogen atoms, or a combination thereof, forming a bridge between 2 $C_5 R'_m$ rings by substitution or to M, which is the same as above, by substituting one $C_5 R'_m$ ring; x is 1 when p is 0 otherwise x is 0; each Q is independently an alkyl group having 1 to 20 carbon atoms, an alkenyl group, an aryl group, an alkylaryl group, an arylalkyl group or a halogen atom; Q' is an alkylidene group having 1 to 20 carbon atoms; s is 0 or 1; m is 5; p is 0, 1, or 2 when s is 0; and m is 4 and p is 1 when s is 1.

A transition metal compound expressed by formula (iii):

(iii)

wherein:
M is a metal of groups 3 to 10 or the Lanthanide series of the Periodic Table of the Elements; Cp* is a cyclopentadienyl or substituted cyclopentadienyl group bound in η5 bonding mode to M; z is a moiety comprising boron, an element of Group 14 of the Periodic Table of the Elements, sulfur, or oxygen, said moiety having up to 20 non-hydrogen atoms, and optionally Cp* and z together form a fused ring system; each X is independently each an anionic ligand group or neutral Lewis base ligand group having up to 30 non-hydrogen atoms; n is 0 or 1 to 4 and is 2 less than the valence of M; and y is an anionic or nonanionic ligand group bonded to z and M comprising nitrogen, phosphorus, oxygen, or sulfur and having up to 20 non-hydrogen atoms, optionally, forming a fused ring system.

Examples of preferred metal coordination compounds include
(tert-butylamido) (tetramethyl-η5-cyclopentadienyl)-1,2-ethanediylzirconium dichloride,
(tert-butylamido) (tetramethyl-η5-cyclopentadienyl)-1,2-ethanediyltitanium dichloride,
(methylamido) (tetramethyl-η5-cyclopentadienyl )-1,2-ethanediylzirconium dichloride,
(methylamido) (tetramethyl-η5-cyclopentadienyl)-1,2-ethanediyltitanium dichloride,
(ethylamido) (tetramethyl-η5-cyclopentadienyl) methylenetitanium dichloride,
(tert-butylamido)dibenzyl(tetramethyl-η5-cyclopentadienyl)silanezirconium dibenzyl,
(benzylamido)dimethyl( tetramethyl-η5-cyclopentadienyl)-silanetitanium dichloride,
(phenylphosphido ) dimethyl (tetramethyl-η5-cyclopentadienyl)-silanezirconium dibenzyl, and
(tertbutylamido) dimethyl (tetramethyl-η5-cyclopentadienyl)-silanetitanium dimethyl.

Suitable cocatalysts for use in single site metallocene catalyst systems include polymeric or oligomeric alumoxanes, especially methyl alumoxane, dimethyl alumoxane, or a modified methyl alumoxane.

Other examples of single site metallocene catalyst systems can be found in U.S. Pat. No. 5,272,236 and 5,317,036.

The polymerization for the production of component (B) can be accomplished at conditions well known in the prior art for Ziegler-Natta or Kaminsky-Sinn type polymerization reactions, that is, temperatures from 0 to 250 degrees C., and pressures from atmospheric to 1000 atmospheres (100 MPa). Suspension, solution, slurry, or gas phase processes can be employed.

A support can be used, but the catalysts are preferably utilized in a homogeneous manner. It will, of course, be appreciated that an active catalyst system, especially nonionic catalysts, will form in situ if the catalyst and the cocatalyst components are added directly to the polymerization reactor together with a suitable solvent or diluent including condensed monomer(s). It is, however, preferred to form the active catalyst in a separate step in a suitable solvent prior to adding same to the polymerization mixture.

A detailed description of a production method for ethylene/alpha-olefin copolymers can be found in Japanese Laid-open Patent 30621/1994 and Japanese International Patent Publication 500622/1995.

Note: With respect to components (C) to (F), parts by weight are based on 100 parts by weight of components (A) and (B) combined.

The third component of the composition is (C) about 2 to about 50 parts by weight, preferably about 2 to about 30 parts by weight, of a polyethylene modified with a functional group containing compound. The polymer is obtained by modification treatment of an ethylene type resin with a functional group containing compound, e.g., an unsaturated carboxylic acid such as fumaric acid, acrylic acid, itaconic acid, methacrylic acid, sorbic acid, crotonic acid, and citraconic acid; an acid anhydride such as maleic acid anhydride, itaconic acid anhydride, citraconic acid anhydride, 5-norbornene-2,3-dicarboxylic acid anhydride, 4-methylcyclohexene-1,2-dicarboxylic acid anhydride, and 4-cyclohexene-1,2-dicarboxylic acid anhydride; an epoxy compound such as glycidyl acrylate, glycidyl methacrylate, and allyl glycidyl ether; a hydroxy compound such as 2-hydroxyethyl acrylate, 2-hydroxyethyl methacrylate, and polyethylene glycol monoacrylate; a methylcarboxylic acid anhydride and 4-cyclohexene-1,2-dicarboxylic acid anhydride; and a methacryloxy propyltrimethoxysilane.

Generally, any polyethylene resin can be used in the modification, e.g., ethylene/vinyl acetate copolymer, ethylene/ethyl acrylate copolymer, high pressure low density polyethylene, linear low density ethylene/alpha-olefin copolymer, high density polyethylene, medium density polyethylene, and ethylene/alpha-olefin copolymers polymerized by using single site catalysts. Many of these polymers are described above.

The amount of the functional group containing compound to be used for the modification treatment can be about 0.1 to about 10 percent by weight of the polyethylene to be modified.

The modification treatment can be carried out by any known process such as the solution, suspension, or melting process exemplified hereinafter.

In the case of a solution process, the polyethylene and the functional group containing compound are placed in a non-polar organic solvent. A radical initiator is then added. The solvent can be, for example, hexane, heptane, benzene, toluene, xylene, chlorobenzene or tetrachloroethane, and the radical initiator can be an organic peroxide such as 2,6-dimethyl-2,5-di(t-butylperoxy)hexane;2,5-dimethyl-2,5-di(t-butylperoxy)hexene-3, benzoyl peroxide; dicumyl peroxide; lauroyl peroxide; tertiary butyl perbenzoate; di(tertiary-butyl) peroxide; cumene hydroperoxide; 2,5-dimethyl-2,5-di(t-butyl-peroxy) hexane; tertiary butyl hydroperoxide; isopropyl percarbonate; and alpha,alpha'-bis(tertiary-butylperoxy)diisopropylbenzene.

In case of a suspension process, the polyethylene and the functional group containing compound are placed in a polar solvent such as water, and the process is carried out by heating at or above 100 degrees C. under high pressure after adding the aforementioned radical initiator.

In case of a melting process, the polyethylene, the functional group containing compound, and a radical initiator are kneaded with melting by using an extruder or a Banbury™ mixer, which are conventionally used as a kneader with melting in the synthetic resin field.

One or more than one kind of a polyethylene modified with a functional group containing compound can be used. It is preferable that the modified polyethylene has a melt flow rate in the range of about 0.1 to about 50 grams per 10 minutes and a density in the range of 0.860 to 0.950 gram per cubic centimeter. The modified polyethylene enhances the affinity between components (A) and (B) and the flame retardant to be added as a filler. It is believed to reduce stress between the surfaces of these components assisting in an even dispersion. When the flame retardant is evenly dispersed, the composition is found to have superior processability, acid resistance, blushing resistance, and other advantageous properties.

The fourth component is (D) about 5 to about 250 parts by weight, preferably about 150 to about 250 parts by weight, of a metal hydrate. It should be noted that the flame retardant portion of the composition of this invention is made up of components (D), (E), and (F). The metal hydrate can be, for example, aluminum hydroxide, magnesium hydroxide, zirconium hydroxide, basic magnesium carbonate, dolomite, hydrotalcite, calcium hydroxide, barium hydroxide, hydrate of tin oxide, and a hydrate of a metal compound such as borax. Among these, magnesium hydroxide having a high melting point is particularly suitable from the point of processability.

The hydrated filler can be surface treated (coated) with a saturated or unsaturated carboxylic acid having about 8 to about 24 carbon atoms and preferably about 12 to about 18 carbon atoms or a metal salt thereof. Coating is optional, but preferred. Mixtures of these acids and/or salts can be used, if desired. Examples of suitable carboxylic acids are oleic, stearic, palmitic, isostearic, and lauric; of metals which can be used to form the salts of these acids are zinc, aluminum, calcium, magnesium, and barium; and of the salts themselves are magnesium stearate, zinc oleate, calcium palmitate, magnesium oleate, and aluminum stearate. The amount of acid or salt can be in the range of about 0.1 to about 5 parts of acid and/or salt per one hundred parts of metal hydrate and is preferably about 0.25 to about 3 parts per one hundred parts of metal hydrate. The surface treatment is described in U.S. Pat. No. 4,255,303. The acid or salt can be merely added to the composition in like amounts rather than using the surface treatment procedure, but this is not preferred. It is particularly preferable to use a metal hydrate surface treated with an amino silane coupling agent disclosed in Japanese Laid-open patent application 38434/1990 as it has a remarkable effect on blushing.

The preferred inorganic flame retardants are the hydrated inorganic flame retardant fillers, magnesium hydroxide (most preferred) and alumina trihydrate. While conventional off-the-shelf magnesium hydroxide and alumina trihydrate can be used, a preferred magnesium hydroxide has the following characteristics: (a) a strain in the <101>direction of no more than $3.0 \times 10^{-3}$; (b) a crystallite size in the <101>direction of more than 800 angstroms; and (c) a surface area, determined by the BET method, of less than 20 square meters per gram. The preferred magnesium hydroxide and a method for its preparation are disclosed in U.S. Pat. No. 4,098,762. A preferred characteristic of this magnesium hydroxide is that the surface area, as determined by the BET method, is less than 10 square meters per gram.

The fifth component is (E) about 1 to about 12 parts by weight, preferably about 5 to 10 parts by weight, of a triazine ring containing compound. Examples are melamine, anmeline, malam, benzoguanamine, acetoguanamine, phthalodiguanamine, melamine cyanurate, melamine pyrophosphate, butylene diguanamine, norbornene diguanamine, methylene dimelamine, ethylene dimelamine, trimethylene dimelamine, tetramethylene dimelamine, hexamethylene dimelamine, and 1,3-hexylene dimelamine. A preferred compound is melamine cyanurate.

The sixth component of the composition of the invention is (F) about 0.5 to about 5 parts by weight, preferably about 1 to about 4 parts by weight, of a flame retardant compound selected from the group consisting of a boron compound, a molybdenum compound, and a silicone. One or more of these compounds can be used in the composition. Examples are boric acid, zinc borate, manganese borate, molybdenum trioxide, calcium zinc molybdate, basic zinc molybdate, calcium molybdate, and an organic organopolysiloxane such as dimethylpolysiloxane.

The mean particle sizes of each of the (D), (E), and (F) compounds are preferably no greater than about 40 microns, and more preferably about 0.1 to about 20 microns. Thus, a fine powder is desirable.

Throughout this disclosure, melt flow rate is measured in accordance with JIS (Japanese Industrial Standards) K6760; density is measured in accordance with JIS K6760; and molecular weight distribution (Mw/Mn) is measured by size discharge chromatography.

The composition of this invention can include conventional additives provided that the particular additive chosen will not adversely affect the composition. The additives can be added to the composition prior to or during the mixing of the components, or prior to or during extrusion. The additives include antioxidants, ultraviolet absorbers or stabilizers, antistatic agents, pigments, dyes, nucleating agents, reinforcing fillers or polymer additives, resistivity modifiers such as carbon black, slip agents, plasticizers, processing aids, lubricants, viscosity control agents, tackifiers, anti-blocking agents, surfactants, extender oils, metal deactivators, voltage stabilizers, fillers, flame retardant additives, crosslinking boosters and catalysts, and smoke suppressants. Additives can be added in amounts ranging from less than about 0.1 to more than about 5 parts by weight for each 100 parts by weight of the resin. Fillers are generally added in larger amounts up to 200 parts by weight or more.

Examples of antioxidants are: hindered phenols such as tetrakis[methylene(3,5-di-tert-butyl-4-hydroxyhydrocinnamate)]methane, bis[(beta-(3,5-ditert-butyl-4hydroxybenzyl)methylcarboxyethyl)]sulphide, 4,4-thiobis(2-methyl-6-tert-butylphenol), butylphenol), 4,4-thiobis(2-tert-butyl-5-methylphenol), 2,2-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl phosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline. Antioxidants can be used in amounts of about 0.1 to about 5 parts by weight per 100 parts by weight of resin.

The various resins can be crosslinked in a conventional manner, if desired. Crosslinking is usually accomplished with an organic peroxide, examples of which are mentioned above. The amount of crosslinking agent used can be in the range of about 0.5 to about 4 parts by weight of organic peroxide for each 100 parts by weight of resin, and is preferably in the range of about 1 to about 3 parts by weight. Crosslinking can also be effected with irradiation or moisture, or in a mold, according to known techniques. Crosslinking temperatures can be in the range of about 150 to about 250 degrees C. and are preferably in the range of about 170 to about 210 degrees C.

The resins can also be made hydrolyzable so that they can be moisture cured. This is accomplished by grafting the resin with, for example, an alkenyl trialkoxy silane in the presence of an organic peroxide (examples are mentioned above), which acts as a free radical generator or catalyst. Useful alkenyl trialkoxy silanes include the vinyl trialkoxy silanes such as vinyl trimethoxy silane, vinyl triethoxy silane, and vinyl triisopropoxy silane. The alkenyl and alkoxy radicals can have 1 to 30 carbon atoms and preferably have 1 to 12 carbon atoms. The hydrolyzable polymers are moisture cured in the presence of a silanol condensation catalyst such as dibutyl tin dilaurate, dioctyl tin maleate, stannous acetate, stannous octoate, lead naphthenate, zinc octoate, iron 2-ethyl hexoate, and other metal carboxylates. The organic peroxides can be the same as those used for crosslinking.

The composition can be blended and kneaded using a BANBURY™ mixer, a HENSCHEL™ mixer, a kneader, a multi-screw extruder, or continuous mixer to obtain a uniformly compounded composition.

The resin composition can be mixed and the cable coated with the resin composition can be prepared in various types of extruders, some of which are described in U.S. Pat. Nos. 4,814,135; 4,857,600; 5,076,988; and 5,153,382. All types of single screw and twin screw extruders and polymer melt pumps and extrusion processes will generally be suitable in effecting the process of this invention as long as they are adapted for mixing or foaming. A typical extruder, commonly referred to as a fabrication extruder will have a solids feed hopper at its upstream end and a melt forming die at its downstream end. The hopper feeds unfluxed plastics into the feed section of a barrel containing the processing screw(s) that flux and ultimately pump the plastic melt through the forming die. At the downstream end, between the end of the screw and the die, there is often a screen pack and a die or breaker plate. Fabrication extruders typically accomplish the mechanisms of solids conveying and compression, plastics fluxing, melt mixing and melt pumping although some two stage configurations use a separate melt fed extruder or melt pump equipment for the melt pumping mechanism. Extruder barrels are equipped with barrel heating and cooling features for startup and improved steady state temperature control. Modern equipment usually incorporates multiple heating/cooling zones starting at the rear feed zone and segmenting the barrel and downstream shaping die. The length to diameter ratio of each barrel is in the range of about 15:1 to about 30:1.

A commercial example of an ethylene/alpha-olefin copolymer (B) is the AFFINITY™ resin, a copolymer produced and sold by the Dow Chemical Corporation. The copolymer is produced with a single site metallocene catalyst and contains 0.01 to 3 long chain branches per 1000 carbon atoms in the backbone of the copolymer.

The advantages of the invention lie in a high grade of flame retardancy equivalent to polyvinyl chloride compositions; essentially no drip; a high grade in the vertical tray flame test; good processability and mechanical properties such as heat resistance, hardness, thermal stability, flexibility, and low temperature characteristic; uniform dispersion of additives throughout the composition; synergistic effect between the three flame retardant compounds; and essentially no emission of harmful gases such as halogen.

The cable in which the composition of the invention is to be used as insulation, jacketing, or as a semiconductive layer comprises one or more electrical conductors or communications media, or a core of two or more electrical conductors or communications media, each electrical conductor, communications medium, or core being surrounded by an insulating composition. The electrical conductors are generally copper and the communications media are generally fiber optics made of glass fibers. The term "cable" includes wires.

This specification is based on Japanese patent application 40946/1999 filed in Japan on Feb. 19, 1999 for which priority is claimed. The applicant is Nippon Unicar Company Limited and the inventors are Hayashi et al.

Patents, patent application, and other publications mentioned in this specification are incorporated by reference herein.

The invention is illustrated by the following examples.

EXAMPLES 1 to 3 AND A COMPARATIVE EXAMPLE

Samples are evaluated using the following test methods:
1. Melt flow rate is determined in accordance with JIS K6760, and is measured with a 2.16 kilogram load at a temperature of 190 degrees C.
2. Density is determined in accordance with JIS K6760.
3. Flow ratio is determined in accordance with JIS K6760. It is a value calculated by dividing flow index measured with a 21.6 kilogram load at 190 degrees C. by the aforementioned melt flow rate.
4. Tensile strength and elongation are determined in accordance with JIS K6760. The measurement is made by No. 3 dumbbell specimen, which is 1 millimeter thick at a pulling rate of 500 millimeters per minute.
5. Heat aging retention ratio is determined by JIS K6723. The tensile strength and elongation are measured before and after the sample is treated at 100 degrees C. for 240 hours, and the results are compared with those before the test. The heat aging retention ratio means that the heat aging readily happens if the ratio is small indicating a lack of heat stability.
6. Hardness is determined in accordance with ASTM D2240. The sheet specimen is 6 millimeters thick.
7. Thermal deformation is determined in accordance with JIS K3005. The sample specimen is a 35 millimeter square, which is 2 millimeters thick, and a change of thickness is measured after 1 hour at 120 degrees C. with a 2 kilogram load, after 1 hour preheating at 120 degrees C.
8. Oxygen index is determined in accordance with JIS K7201. The sample specimen is 3 millimeters thick. When the oxygen index is larger, it means the flame retardancy is more superior.
9. Combustion test is determined in accordance with UL 94. The sheet specimen is 1.5 millimeters thick.
10. Vertical tray flame test is determined in accordance with the vertical tray flame test FT-4 in CAS Standards (C22.2 No. 0.3-92). 24×24 AWG cables (outer diameter of 16.3 millimeters) prepared by covering the compositions described in the examples and comparative example. Flame is applied for 20 minutes by using a burner, and it is classified as "pass" when the combustion is not observed beyond 150 centimeters from the bottom of the burner after extinguishing the flame.

The following raw materials are used in examples 1 to 3 and the comparative example:

1
(A) Ethylene type polymer component
  (A)-1: Ethylene/vinyl acetate copolymer, melt flow rate of 4 grams per 10 minutes; vinyl acetate content of 25 percent by weight 2
(B) Linear ethylene/alpha-olefin copolymer
  (B)-1: Ethylene/1-octene copolymer prepared by using a single site catalyst having a melt flow rate of 0.8 gram per 10 minutes; a density of 0.902 gram per cubic centimeter; and an Mw/Mn of 2.4. The copolymer contains 0.01 to 3 units of long-chain branching in each 1000 carbon atoms of the main chain.

3
(C) Polyethylene modified with a functional group containing compound.
  (C)-1: Maleic anhydride modified ethylene/hexene-1 copolymer, melt flow rate of 1.0 gram/10 minutes; 0.4 percent by weight maleic anhydride.

4
(D) Metal hydrate
  (D)-1: Amino-silane treated magnesium hydroxide
  (D)-2: Stearic acid treated magnesium hydroxide 5
(E) Triazine-ring containing compound
  (E)-1: Melamine cyanurate 6
(F) Third flame retardant compound
  (F)-1: Zinc borate
  (F)-2: Calcium zinc molybdate
  (F)-3: Dimethyl polysiloxane 7
(G) Various additives and auxiliary materials
  (G)-1: Dilaurylthiodipropionate (antioxidant)
  (G)-2: Tetrakis[methylene-3-(3, 5-di-t-butyl-4-hydroxyphenyl)propionate]methane (anitioxidant)
  (G)-3: Calcium stearate (lubricant)

The samples are prepared as follows:

A compound containing the blend of specified raw materials is kneaded for 5 minutes at 160 degrees C. with a Banbury™ mixer, and then pellets are prepared by granulation. Sheets for sample specimens having several thicknesses are prepared from the pellets by molding with a heat press molder at 160 degrees C. and 150 kilograms per square centimeter pressure with 5 minutes pre-heat and 3 minutes compression. In addition 24×24 AWG standard cables (outer diameter of 16.3 millimeters) are prepared by covering the cable wires using the pellets, and they are then tested by the vertical tray flame test.

The raw materials listed in Table I are kneaded, granulated, and molded according to the sample preparation described above; sheets and cables for evaluation are prepared; and then they are tested by the specified measuring methods. The results are shown in Table II. Except where otherwise stated values in Table I are reported in parts by weight.

TABLE I

| raw material | comparative example | example 1 | example 2 | example 3 |
|---|---|---|---|---|
| base resin component | | | | |
| (A)-1: 64% by weight (B)-1: 36% by weight | 100 | 100 | 100 | 100 |
| Polyethylene modified with a functional group containing compound | | | | |
| (C)-1 | 20 | 20 | 20 | 20 |
| metal hydrate | | | | |
| (D)-1 | 170 | 170 | 170 | 170 |
| (D)-2 | 25 | 25 | 25 | 25 |
| Triazine-ring containing compound | | | | |
| (E)-1 | | 6.8 | 6.8 | 6.8 |

TABLE I-continued

| raw material | comparative example | example 1 | example 2 | example 3 |
|---|---|---|---|---|
| third flame retardant compound | | | | |
| (F)-1 | | 1.7 | | |
| (F)-2 | | | 1.7 | |
| (F)-3 | | | | 1.7 |
| various additives and auxiliary materials | | | | |
| (G)-1 | 0.7 | 0.7 | 0.7 | 0.7 |
| (G)-2 | 0.7 | 0.7 | 0.7 | 0.7 |
| (G)-3 | 5.1 | 5.1 | 5.1 | 5.1 |

TABLE II

| Results | comparative example | example 1 | example 2 | example 3 |
|---|---|---|---|---|
| melt flow rate (g/10 min.) | 0.03 | 0.06 | 0.06 | 0.05 |
| density (g/cm$^3$) | 1.461 | 1.466 | 1.468 | 1.447 |
| flow ratio | 300 | 233 | 200 | 220 |
| tensile strength (Mpa) | 12.0 | 12.0 | 11.9 | 11.6 |
| elongation (%) | 360 | 400 | 280 | 320 |
| heat aging retention ratio tensile strength (%) | 97 | 107 | 98 | 103 |
| heat aging retention ratio elongation (%) | 76 | 69 | 72 | 99 |
| hardness | 54 | 55 | 53 | 53 |
| oxygen index | 33 | 32 | 32 | 32 |
| Combustion test UL94 | V-0 | V-0 | V-0 | V-0 |
| vertical tray flame test CSA FT-4 | failed | passed | passed | passed |

Note: UL = Underwriters Laboratory
CSA = Canadian CSA Standard
V-0 = a classification defined by UL 94.

It is clear from Table I and Table II, that each flame retardant composition of the present invention as embodied in examples 1 to 3 not only possesses almost similar processability, and mechanical properties such as tensile strength, elongation, hardness, and thermal stability, but also has excellent combustion test results, and exhibits more advanced flame retardancy by the vertical tray flame test than that of the comparative example. It is also noted that there is essentially no drip. It is concluded that the composition is the equivalent of a vinyl chloride resin composition in cable applications.

What is claimed is:

1. A flame retardant composition comprising (A) about 50 to about 95 percent by weight of at least one polymer selected from the group consisting of ethylene/vinyl ester copolymer; ethylene/alpha, beta unsaturated carboxylate copolymer; and very low density ethylene/alpha-olefin copolymer; and (B) about 5 to about 50 percent by weight of an ethylene/alpha-olefin copolymer having a melt flow rate of about of about 0.5 to about 50 grams per 10 minutes; a density of 0.860 to 0.935 gram per cubic centimeter; and a Mw/Mn ratio of up to about 3, said copolymer having been prepared with a single site catalyst, and, for each 100 parts by weight of component (A) and component (B) combined, (C) about 2 to about 50 parts by weight of a polyethylene modified with a functional group containing compound;

(D) about 5 to about 250 parts by weight of a metal hydrate;

(E) about 1 to about 12 parts by weight of a triazine ring containing compound; and (F) about 0.5 to about 5 parts by weight of a flame retardant compound selected from the group consisting of a boron compound, a molybdenum compound, and a silicone.

2. The composition defined in claim 1 wherein component (A) is an ethylene/vinyl acetate copolymer or an ethylene/ethyl acrylate copolymer.

3. The compostion defined in claim 1 wherein component (B) is an ethylene/1-octene copolymer.

4. The composition defined in claim 1 wherein component (C) is an ethylene/alpha-olefin copolymer modified with maleic anhydride.

5. The composition defined in claim 1 wherein component (D) is a surface treated magnesium hydroxide or alumina trihydrate.

6. The composition defined in claim 1 wherein component (E) is melamine cyanurate.

7. The composition defined in claim 1 wherein component (F) is zinc borate, calcium zinc molybdate, or dimethyl polysiloxane.

8. The composition defined in claim 1 wherein component (B) has a Mw/Mn ratio no greater than about 2.5.

9. The composition defined in claim 5 wherein the inorganic flame retardant is surface treated with a saturated or unsaturated carboxylic acid or salt thereof.

10. A cable comprising one or more electrical conductors or communications media, or a core of two or more electrical conductors or communications media, each electrical conductor, communications medium, or core being surrounded by a composition comprising (A) about 50 to about 95 percent by weight of at least one polymer selected from the group consisting of ethylene/vinyl ester copolymer; ethylene/alpha, beta unsaturated carboxylate copolymer; and very low density ethylene/alpha-olefin copolymer; and (B) about 5 to about 50 percent by weight of an ethylene/alpha-olefin copolymer having a melt flow rate of about of about 0.5 to about 50 grams per 10 minutes; a density of 0.860 to 0.935 gram per cubic centimeter; and a Mw/Mn ratio of up to about 3, said copolymer having been prepared with a single site catalyst, and, for each 100 parts by weight of component (A) and component (B) combined, (C) about 2 to about 50 parts by weight of a polyethylene modified with a functional group containing compound;

(D) about 5 to about 250 parts by weight of a metal hydrate;

(E) about 1 to about 12 parts by weight of a triazine ring containing compound; and (F) about 0.5 to about 5 parts by weight of a flame retardant compound selected from the group consisting of a boron compound, a molybdenum compound, and a silicone.

* * * * *